(12) United States Patent
Ghaderi (10) Patent No.: US 11,190,124 B2
(45) Date of Patent: Nov. 30, 2021

(54) MOTOR CONTROL METHOD, POWER CONVERSION DEVICE, MOTOR MODULE, AND ELECTRIC POWER STEERING DEVICE

(71) Applicant: Nidec Corporation, Kyoto (JP)

(72) Inventor: Ahmad Ghaderi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 114 days.

(21) Appl. No.: 16/636,920

(22) PCT Filed: Jun. 15, 2018

(86) PCT No.: PCT/JP2018/022990
§ 371 (c)(1),
(2) Date: Feb. 6, 2020

(87) PCT Pub. No.: WO2019/058668
PCT Pub. Date: Mar. 28, 2019

(65) Prior Publication Data
US 2020/0186074 A1 Jun. 11, 2020

(30) Foreign Application Priority Data

Sep. 21, 2017 (JP) .............................. JP2017-180913

(51) Int. Cl.
*H02P 27/06* (2006.01)
*B62D 5/04* (2006.01)
(Continued)

(52) U.S. Cl.
CPC ................ *H02P 27/06* (2013.01); *B62D 5/04* (2013.01); *H02H 7/09* (2013.01); *H02M 1/32* (2013.01); *H02M 7/48* (2013.01)

(58) Field of Classification Search
CPC . H02P 27/06; B62D 5/04; H02H 7/09; H02M 1/32; H02M 7/48
See application file for complete search history.

(56) References Cited

U.S. PATENT DOCUMENTS

2013/0094266 A1    4/2013  Balpe
2014/0077745 A1    3/2014  Kinouchi et al.
(Continued)

FOREIGN PATENT DOCUMENTS

| JP | 06-233450 A | 8/1994 |
| JP | 2008-132919 A | 6/2008 |
| JP | 2008-219956 A | 9/2008 |

OTHER PUBLICATIONS

Official Communication issued in International Patent Application No. PCT/JP2018/022990, dated Sep. 18, 2018.

*Primary Examiner* — Zoheb S Imtiaz
(74) *Attorney, Agent, or Firm* — Keating & Bennett (57) ABSTRACT

A motor control method includes acquiring n-phase currents, where n is an integer of three or more, of a first inverter, a GND current of the first inverter, n-phase currents of a second inverter, and a GND current of the second inverter, generating a first fault signal indicating presence or absence of a shunt resistor fault in the first inverter based on the n-phase currents and GND current of the first inverter and generating a second fault signal indicating presence or absence of a shunt resistor fault in the second inverter based on the n-phase currents and GND current of the second inverter, referring to a table representing a relationship between a set of levels of the first fault signal and the second fault signal and control modes and selecting one of the control modes, and controlling a motor in accordance with the selected control mode.

15 Claims, 8 Drawing Sheets

(51) Int. Cl.
*H02H 7/09* (2006.01)
*H02M 1/32* (2007.01)
*H02M 7/48* (2007.01)

(56) References Cited

U.S. PATENT DOCUMENTS

| | | |
|---|---|---|
| 2016/0036305 A1 | 2/2016 | Kawata et al. |
| 2016/0036371 A1 | 2/2016 | Yamasaki |
| 2017/0063260 A1* | 3/2017 | Li .............................. H02P 5/74 |
| 2017/0077859 A1* | 3/2017 | Chretien .................. H02P 1/44 |

* cited by examiner

MOTOR CONTROL METHOD, POWER CONVERSION DEVICE, MOTOR MODULE, AND ELECTRIC POWER STEERING DEVICE

CROSS REFERENCE TO RELATED APPLICATIONS

This is a U.S. national stage of PCT Application No. PCT/JP2018/022990, filed on Jun. 15, 2018, and priority under 35 U.S.C. § 119(a) and 35 U.S.C. § 365(b) is claimed from Japanese Application No. 2017-180913, filed Sep. 21, 2017; the entire disclosures of each application are hereby incorporated herein by reference.

FIELD OF THE INVENTION

The present disclosure relates to a motor control method, a power conversion device, a motor module, and an electric power steering device.

BACKGROUND

In recent years, an electromechanically integrated motor in which an electric motor (hereinafter simply referred to as "motor"), an inverter, and an ECU are integrated has been developed. In particular, high quality needs to be ensured from the viewpoint of safety in the automotive field. Therefore, a redundant design in which safe operation can be continued even when some parts are faulty is adopted. As an example of the redundant design, it is considered to provide two power conversion devices for one motor. As another example, it is considered to provide a backup microcontroller in addition to a main microcontroller.

There has been known a motor drive device having a first system and a second system. The first system is connected to a first winding group of a motor and includes a first inverter part, a power relay, a reverse connection protection relay, and the like. The second system is connected to a second winding group of the motor and includes a second inverter part, a power relay, a reverse connection protection relay, and the like. When no fault occurs in the motor drive device, it is possible to drive the motor using both the first system and the second system. On the other hand, when a fault occurs in one of the first system and the second system or in one of the first winding group and the second winding group, the power relay cuts off the power supply from a power supply to the faulty system or the system connected to the faulty winding group. It is possible to continue motor driving using the other system that is not faulty.

In known motor drive devices having a first system and a second system, even if one system or one winding group is faulty, motor driving can be continued using the other system that is not faulty.

There has been known a motor drive device that includes four electrical isolation means and two inverters, and converts power supplied to a three-phase motor. One electrical separation means is provided between a power supply and the inverter for one inverter, and one electrical isolation means is provided between the inverter and a ground (hereinafter referred to as GND). It is possible to drive a motor by the inverter that is not faulty using a neutral point of a winding in the faulty inverter. At that time, the faulty inverter is separated from the power supply and the GND by turning the two electrical isolation means connected to the faulty inverter into a cut-off state.

There is a demand for appropriate detection of a shunt resistor fault used for detection of a phase current in the above-described related arts.

SUMMARY

A motor control method according to an example embodiment of the present disclosure is a motor control method used in a power conversion device, which converts power from a power supply into power to be supplied to a motor having n-phase windings, where n is an integer of three or more, and includes a first inverter connected to first ends of the n-phase windings and a second inverter connected to second ends of the n-phase windings, and includes a current acquisition step of acquiring n-phase currents flowing through n first shunt resistors included in n legs of the first inverter, a GND current flowing through a second shunt resistor provided on a GND line of the first inverter, n-phase currents flowing through n third shunt resistors included in n legs of the second inverter, and a GND current flowing through a fourth shunt resistor provided on a GND line of the second inverter, a fault signal generation step of generating a first fault signal indicating presence or absence of a shunt resistor fault in the first inverter based on the n-phase currents flowing through the n first shunt resistors and the GND current flowing through the second shunt resistor and generating a second fault signal indicating presence or absence of a shunt resistor fault in the second inverter based on the n-phase currents flowing through the n third shunt resistors and the GND current flowing through the fourth shunt resistor, a control mode selection step of referring to a table representing a relationship between a set of levels of the first fault signal and the second fault signal and a plurality of control modes and selecting one control mode from among the plurality of control modes, and a motor control step of controlling the motor in accordance with the selected control mode.

A motor control method according to another example embodiment of the present disclosure is a motor control method used in a power conversion device, which converts power from a power supply into power to be supplied to a motor having n-phase windings, where n is an integer of three or more, whose first ends are Y-connected and includes an inverter connected to second ends of the n-phase windings, and includes a current acquisition step of acquiring n-phase currents flowing through n first shunt resistors included in n legs of the inverter and a GND current flowing through a second shunt resistor provided on a GND line of the inverter, a fault signal generation step of generating a fault signal indicating presence or absence of a shunt resistor fault in the inverter based on the n-phase currents and the GND current, a control mode selection step of referring to a table representing a relationship between a level of the fault signal and a plurality of control modes and selecting one control mode from among the plurality of control modes, and a motor control step of controlling the motor in accordance with the selected control mode.

The above and other elements, features, steps, characteristics and advantages of the present disclosure will become more apparent from the following detailed description of the example embodiments with reference to the attached drawings.

DETAILED DESCRIPTION

Hereinafter, example embodiments of motor control methods, power conversion devices, motor modules, and electric power steering devices of the present disclosure will be described in detail with reference to the accompanying drawings. However, a detailed description more than necessary is sometimes omitted in order to avoid unnecessary redundancy of the following description and make it easier for a person skilled in the art to understand. For example, a detailed description of already well-known matter and a duplicated description on substantially the same configuration is sometimes omitted.

In the present specification, the example embodiments of the present disclosure will be described with an example of a power conversion device that converts power from a power supply into power to be supplied to a three-phase motor having three-phase (A-phase, B-phase, and C-phase) windings. Meanwhile, the present disclosure encompasses a power conversion device that converts power from a power supply into power to be supplied to an n-phase motor having n-phase (n is an integer of four or more) windings, such as four-phase windings and five-phase windings, and a motor control method used in the power conversion device.

Figure 1:
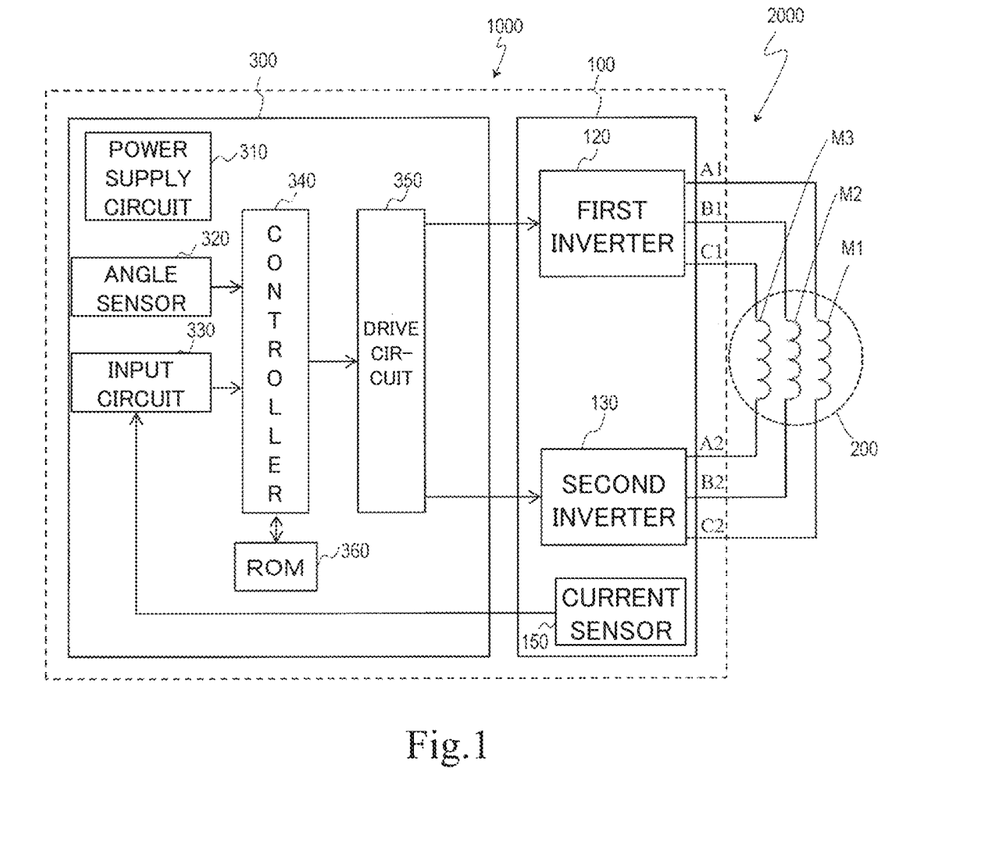
FIG. 1 is a block diagram schematically illustrating a typical block configuration of a motor module 2000 according to a first example embodiment of the present disclosure.

FIG. 1 schematically illustrates a typical block configuration of a motor module 2000 according to the present example embodiment.

The motor module 2000 typically includes a power conversion device 1000 having an inverter unit 100 and a control circuit 300, and a motor 200. The motor module 2000 is modularized and can be manufactured and sold as, for example, an electromechanically integrated motor having a motor, a sensor, a driver, and a controller.

The power conversion device 1000 can convert power from a power supply 101 (see FIG. 2) into power to be supplied to the motor 200. The power conversion device 1000 is connected to the motor 200. For example, the power conversion device 1000 can convert DC power into three-phase AC power that is pseudo-sine waves of an A-phase, a B-phase, and a C-phase. In the present specification, "connection" between parts (components) mainly means electrical connection.

The motor 200 is, for example, a three-phase AC motor. The motor 200 includes an A-phase winding M1, a B-phase winding M2, and a C-phase winding M3, and is connected to a first inverter 120 and a second inverter 130 of the inverter unit 100. To be more specific, the first inverter 120 is connected to one end of the winding of each phase of the motor 200, and the second inverter 130 is connected to the other end of the winding of each phase.

The control circuit 300 includes, for example, a power supply circuit 310, an angle sensor 320, an input circuit 330, a controller 340, a drive circuit 350, and a ROM 360. Each part of the control circuit 300 is mounted on, for example, one circuit board (typically a printed board). The control circuit 300 is connected to the inverter unit 100, and controls the inverter unit 100 based on input signals from the current sensor 150 and the angle sensor 320. Examples of a control method thereof include vector control, pulse width modulation (PWM), and direct torque control (DTC). Meanwhile, the angle sensor 320 is sometimes unnecessary depending on a motor control method (for example, sensorless control).

The control circuit 300 can realize closed-loop control by controlling target position, rotation speed, current, and the like of the motor 200. Incidentally, the control circuit 300 may include a torque sensor instead of the angle sensor 320. In this case, the control circuit 300 can control a target motor torque.

The power supply circuit 310 generates a power supply voltage (for example, 3 V or 5 V) necessary for each block in the circuit based on a voltage of 12 V of the power supply 101, for example.

The angle sensor 320 is, for example, a resolver or a Hall IC. Alternatively, the angle sensor 320 is also realized by a combination of an MR sensor having a magnetoresistive (MR) element and a sensor magnet. The angle sensor 320 detects a rotation angle of a rotor (hereinafter referred to as a "rotation signal") and outputs the rotation signal to the controller 340.

The input circuit 330 receives a phase current detected by the current sensor 150 (hereinafter sometimes referred to as "actual current value"), converts a level of the actual current value to an input level of the controller 340 as necessary, and outputs the actual current value to the controller 340. The input circuit 330 is, for example, an analog/digital conversion circuit.

The controller 340 is an integrated circuit that controls the entire power conversion device 1000, and is, for example, a microcontroller or a field programmable gate array (FPGA). The controller 340 controls a switching operation (turn-on or turn-off) of each switching element (typically a semiconductor switching element) in the first and second inverters 120 and 130 of the inverter unit 100. The controller 340 sets a target current value according to the actual current value, the rotation signal of the rotor, and the like, generates a PWM signal, and outputs the PWM signal to the drive circuit 350.

The drive circuit 350 is typically a pre-driver (sometimes referred to as a "gate driver"). The drive circuit 350 generates a control signal (gate control signal) to control the switching operation of each switching element in the first and second inverters 120 and 130 of the inverter unit 100 according to the PWM signal, and gives the control signal to a gate of each switching element. When a driving target is a motor that can be driven with a low voltage, the pre-driver is not necessarily required in some cases. In such a case, the function of the pre-driver can be implemented in the controller 340.

The ROM 360 is, for example, a writable memory (for example, PROM), a rewritable memory (for example, a flash memory), or a read-only memory. The ROM 360 stores a control program including a command group configured to cause the controller 340 to control the power conversion device 1000. For example, the control program is temporarily expanded in a RAM (not illustrated) at the time of booting.

A specific circuit configuration of the inverter unit 100 will be described with reference to FIG. 2.

Figure 2:
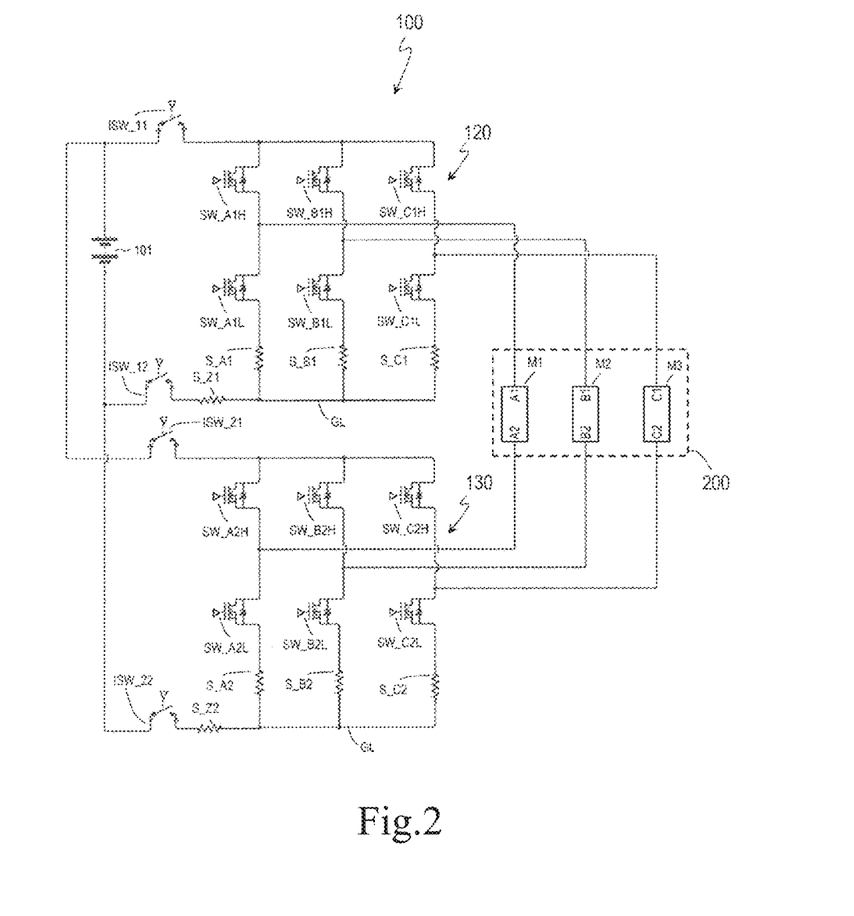
FIG. 2 is a circuit diagram schematically illustrating a circuit configuration of an inverter unit 100 according to the first example embodiment of the present disclosure.

FIG. 2 schematically illustrates a circuit configuration of the inverter unit 100 according to the present example embodiment.

The power supply 101 generates a predetermined power supply voltage (for example, 12 V). As the power supply 101, for example, a DC power supply is used. However, the power supply 101 may be an AC-DC converter or a DC-DC converter, or may be a battery (storage battery). The power supply 101 may be a single power supply common to the first and second inverters 120 and 130 as illustrated in the drawing, or may include a first power supply (not illustrated) for the first inverter 120 and a second power supply (not illustrated) for the second inverter 130.

Fuses ISW_11 and ISW_12 are connected between the power supply 101 and the first inverter 120. The fuses ISW_11 and ISW_12 can cut off a large current that can flow from the power supply 101 to the first inverter 120. Fuses ISW_21 and ISW_22 are connected between the power supply 101 and the second inverter 130. The fuses ISW_21 and ISW_22 can cut off a large current that can flow from the power supply 101 to the second inverter 130. A relay or the like may be used instead of the fuse.

Coils are provided between the power supply 101 and the first inverter 120 and between the power supply 101 and the second inverter 130 although not illustrated. The coil functions as a noise filter, and smoothes high-frequency noise included in a voltage waveform supplied to each inverter or high-frequency noise generated by each inverter so as not to flow toward the power supply 101. In addition, a capacitor is connected to a power supply terminal of each inverter. The capacitor is a so-called bypass capacitor and suppresses a voltage ripple. The capacitor is, for example, an electrolytic capacitor, and the capacity and the number to be used are appropriately determined according to design specifications and the like.

The first inverter 120 has a bridge circuit constituted by three legs. Each leg has a high-side switching element, a low-side switching element, and a shunt resistor. An A-phase leg includes a high-side switching element SW_A1H, a low-side switching element SW_A1L, and a first shunt resistor S_A1. The B-phase leg has a high-side switching element SW_B1H, a low-side switching element SW_B1L, and a first shunt resistor S_B1. The C-phase leg has a high-side switching element SW_C1H, a low-side switching element SW_C1L, and a first shunt resistor S_C1.

As the switching element, for example, a field-effect transistor (typically MOSFET) in which a parasitic diode is formed or a combination of an insulated gate bipolar transistor (IGBT) and a freewheeling diode connected in parallel thereto can be used.

The first shunt resistor S_A1 is used to detect an A-phase current IA1 flowing through the A-phase winding M1 and is connected, for example, between the low-side switching element SW_A1L and a GND line GL. The first shunt resistor S_B1 is used to detect a B-phase current IB1 flowing through the B-phase winding M2 and is connected, for example, between the low-side switching element SW_B1L and the GND line GL. The first shunt resistor S_C1 is used to detect a C-phase current IC1 flowing through the C-phase winding M3 and is connected, for example, between the low-side switching element SW_C1L and the GND line GL. Further, the GND line GL is provided with a second shunt resistor S_Z1 used to detect a GND current IZ1 flowing through the GND line. The four shunt resistors S_A1, S_B1, S_C1, and S_Z1 are connected in common with the GND line GL of the first inverter 120.

The second inverter 130 has a bridge circuit constituted by three legs. Each leg has a high-side switching element, a low-side switching element, and a shunt resistor. An A-phase leg includes a high-side switching element SW_A2H, a low-side switching element SW_A2L, and a shunt resistor S_A2. The B-phase leg has a high-side switching element SW_B2H, a low-side switching element SW_B2L, and a shunt resistor S_B2. The C-phase leg has a high-side switching element SW_C2H, a low-side switching element SW_C2L, and a shunt resistor S_C2.

The shunt resistor S_A2 is used to detect an A-phase current IA2 and is connected, for example, between the low-side switching element SW_A2L and the GND line GL. The shunt resistor S_B2 is used to detect a B-phase current IB2 and is connected between, for example, the low-side switching element SW_B2L and the GND line GL. The shunt resistor S_C2 is used to detect a C-phase current IC2 and is connected, for example, between the low-side switching element SW_C2L and the GND line GL. Further, the GND line GL is provided with a fourth shunt resistor S_Z2 used to detect a GND current IZ2 flowing through the GND line. The four shunt resistors S_A2, S_B2, S_C2, and S_Z2 are connected in common with the GND line GL of the second inverter 130.

The above-described current sensor 150 includes, for example, the shunt resistors S_A1, S_B1, S_C1, S_Z1, S_A2, S_B2, S_C2, and S_Z2, and a current detection circuit (not illustrated) that detects a current flowing through each shunt resistor.

The A-phase leg of the first inverter 120 (specifically, a node between the high-side switching element SW_A1H and the low-side switching element SW_A1L) is connected to one end A1 of the A-phase winding M1 of the motor 200, and the A-phase leg of the second inverter 130 is connected to the other end A2 of the A-phase winding M1. The B-phase leg of the first inverter 120 is connected to one end B1 of the B-phase winding M2 of the motor 200, and the B-phase leg of the second inverter 130 is connected to the other end B2 of the winding M2. The C-phase leg of the first inverter 120 is connected to one end C1 of the C-phase winding M3 of the motor 200, and the C-phase leg of the second inverter 130 is connected to the other end C2 of the winding M3.

A specific example of a motor control method used in a power conversion device will be described using the power conversion device 1000 illustrated in FIG. 1 as an example, and a method for detecting a shunt resistor fault will be mainly described while referring to FIGS. 3 and 4. However, the motor control method of the present disclosure can be suitably used for a power conversion device including a shunt resistor in each phase leg and a GND line of an inverter.

Prior to describing the motor control method, the knowledge serving the basis of the present disclosure will be described.

For example, a current flowing through the winding of each phase can be controlled independently in control (referred to as "three-phase energization control") of energizing the windings M1, M2, and M3 in the power conversion device 1000 illustrated in FIG. 1, and thus, it is possible to drive the motor by energizing two phases (for example, A-phase and B-phase) among the three phases. The present inventor has focused on the relationship between the GND current flowing in the GND line of the inverter and the three-phase current, and studied the method for detecting the shunt resistor fault.

The outline of the motor control method having the shunt resistor fault detection is as follows.

First, the three-phase currents IA1, IB1, and IC1 flowing through the three first shunt resistors S_A1, S_B1, and S_C1 included in the three legs of the first inverter 120, the GND current IZ1 flowing through the second shunt resistor S_Z1 provided on the GND line GL of the first inverter 120, the three-phase currents IA2, IB2, and IC2 flowing through the three third shunt resistors S_A2, S_B2, and S_C2 included in the three legs of the second inverter 130, and the GND current IZ2 flowing through the fourth shunt resistor S_Z2 provided on the GND line GL of the second inverter 130 are acquired (a current acquisition step).

Next, a first fault signal indicating presence or absence of the shunt resistor fault in the first inverter 120 is generated based on the three-phase currents IA1, IB1, and IC1 and the GND current IZ1, and a second fault signal indicating presence or absence of the shunt resistor fault in the second inverter 130 is generated based on the three-phase currents IA2, IB2, and IC2 and the GND current IZ2 (a fault signal generation step).

Next, one control mode is selected from among a plurality of control modes with reference to a look-up table (LUT) that represents a relationship between a set of levels of the first fault signal and the second fault signal and the plurality of control modes (a control mode selection step).

Next, the motor 200 is controlled in accordance with the selected control mode (a motor control step).

The current acquisition step, the fault signal generation step, the control mode selection step, and the motor control step are repeatedly executed in synchronization with a period of measuring each phase current by the current sensor 150, for example.

An algorithm for realizing the motor control method according to the present example embodiment can be realized only by hardware, for example, a microcontroller, an application specific integrated circuit (ASIC), or an FPGA, or can also be realized by a combination of hardware and software.

Figure 3:
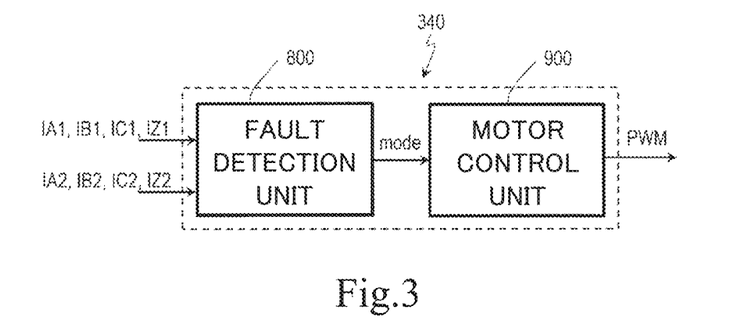
FIG. 3 is a functional block diagram illustrating functional blocks of a controller 340 configured to perform overall motor control.
Figure 4:
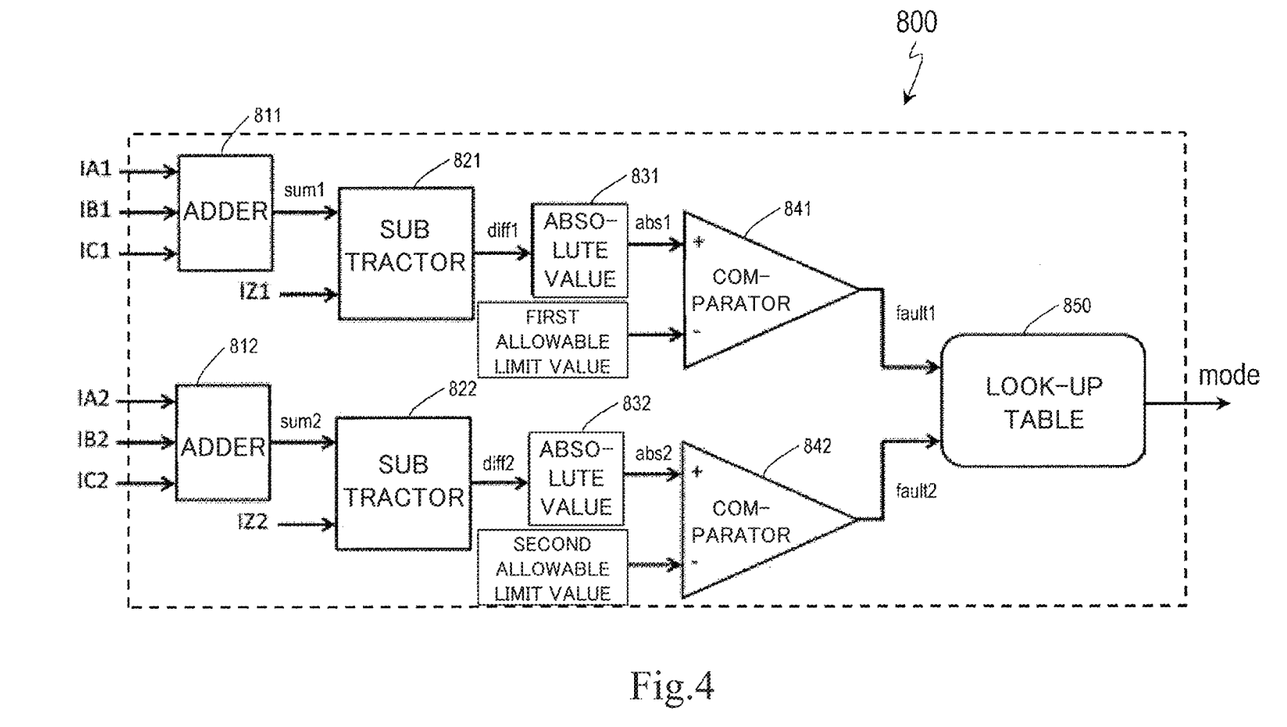
FIG. 4 is a functional block diagram illustrating functional blocks configured to perform shunt resistor fault detection.

FIG. 3 illustrates functional blocks of the controller 340 configured to perform the overall motor control. FIG. 4 illustrates functional blocks configured to perform the shunt resistor fault detection.

In the present specification, the respective blocks in the functional block diagram are illustrated not in units of hardware but in units of functional blocks. Software used for the motor control and shunt resistor fault detection can be, for example, a module constituting a computer program configured to execute a specific process corresponding to each functional block. Such a computer program is stored in the ROM 360, for example. The controller 340 can read out a command from the ROM 360 and sequentially execute each process.

The controller 340 includes, for example, a fault detection unit 800 and a motor control unit 900.

The fault detection unit 800 acquires the three-phase currents IA1, IB1, and IC1 and the GND current IZ1 detected on the first inverter 120 side of the inverter unit 100, further acquires the three-phase currents IA2, IB2, and IC2 and the GND current IZ2 detected on the second inverter 130 side of the inverter unit 100, and selects one control mode from among the plurality of control modes. The fault detection unit 800 outputs a mode signal mode corresponding to the selected control mode to the motor control unit 900.

Based on the mode signal mode, the motor control unit 900 generates a PWM signal to control the overall switching operation of the switching elements of the first and second inverters 120 and 130, for example, using vector control. The motor control unit 900 outputs the PWM signal to the drive circuit 350.

The motor control unit 900 switches the control of the first and second inverters 120 and 130 in accordance with the mode signal mode. To be more specific, the motor control unit 900 can determine each on/off state including the switching operation of the switching elements of the first and second inverters 120 and 130 based on the mode signal mode. The motor control unit 900 can further determine each on/off state of the fuses ISW_11, ISW_12, ISW_21, and ISW_22 based on the mode signal mode.

In the present specification, each functional block is sometimes referred to as a unit for convenience of description. Of course, this term is not used with an intention to limit the interpretation of each functional block to hardware or software.

When each functional block is implemented in the controller 340 as software, an execution subject of the software may be a core of the controller 340, for example. As described above, the controller 340 can be realized by the FPGA. In such a case, all or some of the functional blocks may be realized by hardware.

As the processing is distributed using a plurality of FPGAs, it is possible to distribute a computational load of a specific computer. In such a case, all or some of the functional blocks illustrated in FIGS. 3 and 4 may be distributed and implemented in the plurality of FPGAs. The plurality of FPGAs are communicably connected to each other by, for example, an in-vehicle control area network (CAN), and can transmit and receive data.

The fault detection unit 800 includes, for example, adders 811 and 812, subtractors 821 and 822, absolute value units 831 and 832, comparators 841 and 842, and the LUT.

The adder 811 calculates a sum sum1 (=IA1+IB1+IC1) of the three-phase currents IA1, IB1, and IC1. The adder 812 calculates a sum sum2 (=IA2+IB2+IC2) of the three-phase currents IA2, IB2, and IC2.

The subtractor 821 obtains a difference diff1 between the sum sum1 of the three-phase currents IA1, IB1, and IC1 and the GND current IZ1. The subtractor 822 calculates a difference diff2 between the sum sum2 of the three-phase currents IA2, IB2, and IC2 and the GND current IZ2.

The absolute value unit 831 obtains a first absolute value abs1 (=|IA1+IB1+IC1−IZ1|) of the difference diff1. The absolute value unit 832 obtains a second absolute value abs2 (=|IA2+IB2+IC2−IZ2|) of the difference diff2.

The comparators 841 and 842 are, for example, hysteresis comparators. According to the hysteresis comparator, jitter of an output signal can be suppressed even if noise is added to an input signal. The comparator 841 generates a first fault signal fault1 based on a comparison result between the first absolute value abs1 and a first allowable limit value. The comparator 842 generates a second fault signal fault2 based on a comparison result between the second absolute value abs2 and a second allowable limit value. In other words, the comparator 841 determines whether or not the first absolute value abs1 is within an allowable range. The comparator 842 determines whether or not the second absolute value abs2 is within an allowable range.

The first allowable limit value is a value that depends on the performance of each of the first shunt resistors S_A1, S_B1, and S_C1. The second allowable limit value is a value that depends on the performance of each of the third shunt resistors S_A2, S_B2, and S_C2. Typically, the shunt resistors having the same performance are used as the first shunt resistors S_A1, S_B1, and S_C1 and the third shunt resistors S_A2, S_B2, and S_C2, and thus, the first and second allowable limit values indicate the same value.

The comparator 841 generates the first fault signal fault1 indicating a shunt resistor fault in the first inverter 120 when the first absolute value abs1 exceeds the first allowable limit value, and generates the first fault signal fault1 indicating no shunt resistor fault in the first inverter 120 when the first absolute value abs1 is less than the first allowable limit value. The shunt resistor fault in the first inverter 120 indicates a fault of at least one of the first shunt resistors S_A1, S_B1, and S_C1. For example, "1 (high level)" can be assigned to the first fault signal fault1 indicating the shunt resistor fault, and "0 (low level)" can be assigned to the first fault signal fault1 indicating no shunt resistor fault.

The comparator 842 generates the second fault signal fault2 indicating a shunt resistor fault in the second inverter 130 when the second absolute value abs2 exceeds the second allowable limit value, and generates the second fault signal fault2 indicating no shunt resistor fault in the second inverter 130 when the second absolute value abs2 is less than the second allowable limit value. The shunt resistor fault in the second inverter 130 indicates a fault of at least one of the third shunt resistors S_A2, S_B2, and S_C2. Similarly to the first fault signal fault1, for example, "1 (high level)" can be assigned to the second fault signal fault2 indicating the shunt resistor fault, and "0 (low level)" can be assigned to the second fault signal fault2 indicating no shunt resistor fault.

According to the fault detection method of the present disclosure, the sum sum1 of the three-phase currents IA1, IB1, and IC1 is theoretically equal to the GND current IZ1, and the sum sum2 of the three-phase currents IA2, IB2 and IC2 is theoretically equal to the GND current IZ2 when the shunt resistor is not faulty. In practice, however, these values are not equal, and thus, the allowable limit values are set in consideration of such an error. On the other hand, this equilibrium relationship collapses when the shunt resistor is faulty. It is possible to detect the shunt resistor fault by monitoring this collapse of the equilibrium relationship.

A look-up table (LUT) 850 represents a relationship between a set of levels of the first fault signal fault1 and the second fault signal fault2 and the plurality of control modes. Table 1 illustrates contents of the look-up table. The LUT 850 further represents control schemes of the switching elements of the first and second inverters 120 and 130 and on/off states of the fuses ISW_11, ISW_12, ISW_21 and ISW_22, for each control mode.

TABLE 1

| CONTROL MODE | fault1 | fault2 | SWITCHING ELEMENTS Of FIRST INVERTER 120 | SWITCHING ELEMENTS Of SECOND INVERTER 130 | FUSES ISW_11 AND ISW_12 | FUSES ISW_21 AND ISW_22 |
|---|---|---|---|---|---|---|
| FIRST CONTROL MODE (00) | 0 | 0 | PWM CONTROL | PWM CONTROL | ON | ON |
| FIRST CONTROL MODE (00) | 0 | 0 | PWM CONTROL OR ALL ON | PWM CONTROL OR ALL ON | ON OR OFF | ON OR OFF |
| SECOND CONTROL MODE (10) | 1 (FAULT) | 0 | ALL ON | RWM CONTROL (Y CONNCECTION) | OFF | ON |
| SECOND CONTROL MODE (01) | 0 | 1 (FAULT) | PWM CONTROL (Y CONNCECTION) | ALL ON | ON | OFF |
| THIRD CONTROL MODE (11) | 1 (FAULT) | 1 (FAULT) | ALL OFF | ALL OFF | OFF | OFF |

The plurality of control modes include first to third control modes. The first control mode is a control mode during a normal state which is used when no shunt resistor is faulty. Specifically, the first control mode is a control mode in which the windings M1, M2, and M3 are energized using both the first and second inverters 120 and 130. Alternatively, the first control mode may be a control mode in which the windings M1, M2, and M3 are energized using a neutral point of one of the first and second inverters 120 and 130 and the other.

The second control mode is a control mode during an abnormal state which is used when a shunt resistor of one of the first and second inverters 120 and 130 is faulty. The second control mode is a control mode in which the windings M1, M2, and M3 are energized using the neutral point of one of the first and second inverters 120 and 130 including the faulty shunt resistor and the other.

The third control mode is a control mode during an abnormal state which is used when shunt resistors of both the first and second inverters 120 and 130 are faulty. The third control mode is a control mode in which the energization of the windings M1, M2, and M3 is shut down.

According to the LUT in Table 1, when both the levels of the first and second fault signals fault1 and fault2 indicate "0", the first control mode is selected. The mode signal mode corresponding to the selected control mode is output from the fault detection unit 800. The mode signal mode can be expressed by two bits, for example. For example, "00" can be assigned to the mode signal mode of the first control mode.

When the level of the first fault signal fault1 indicates "1" and the level of the second fault signal fault2 indicates "0", the second control mode is selected. In such a case, for example, "10" can be assigned to the mode signal mode of the second control mode. Further, when the level of the first fault signal fault1 indicates "0" and the level of the second fault signal fault2 indicates "1", the second control mode is selected. For example, "01" can be assigned to the mode signal mode of the second control mode.

When both the levels of the first and second fault signals fault1 and fault2 indicate "1", the third control mode is selected. For example, "11" can be assigned to the mode signal mode of the third control mode.

The mode signal mode is output to the motor control unit 900. The motor control unit 900 can share the same LUT as the fault detection unit 800. The motor control unit 900 can refer to the LUT and switch the control method of the first and second inverters 120 and 130 in accordance with the mode signal mode.

When the motor control unit 900 receives the mode signal mode indicating "00", the motor control unit 900 refers to the LUT and selects the first control mode. The motor control unit 900 generates a PWM signal to control the switching operation of all the switching elements of both the first and second inverters 120 and 130, and outputs the PWM signal to the drive circuit 350 (see FIG. 1). As a result, it is possible to energize the windings M1, M2, and M3 (by three-phase energization control) to drive the motor 200.

In the first control mode, for example, the motor control unit 900 turns on all the fuses ISW_11, ISW_12, ISW_21, and ISW_22. As a result, the motor 200 is connected to the power supply 101 via the first inverter 120 and the second inverter 130. In the present example embodiment, the fuses ISW_11, ISW_12, ISW_21, and ISW_22 are controlled by the motor control unit 900. However, these fuses can also be controlled by the drive circuit 350, for example.

Figure 5:
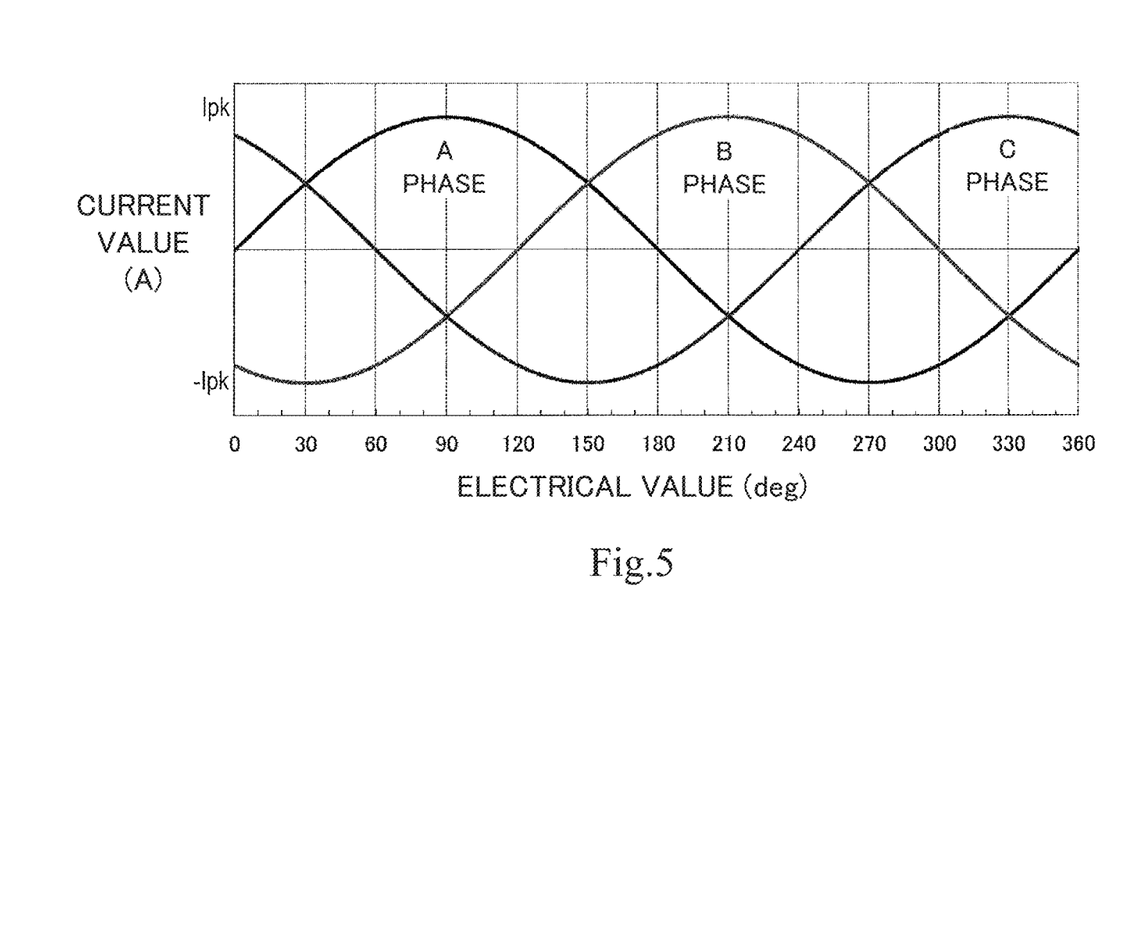
FIG. 5 is a graph illustrating a current waveform (sine wave) obtained by plotting current values flowing through A-phase, B-phase, and C-phase windings of a motor 200 when the inverter unit 100 is controlled according to three-phase energization control.

FIG. 5 illustrates a current waveform (sine wave) obtained by plotting current values flowing through A-phase, B-phase, and C-phase windings of the motor 200 when the inverter unit 100 is controlled according to three-phase energization control. The horizontal axis represents a motor electrical angle (deg), and the vertical axis represents a current value (A). In the current waveform of FIG. 5, the current value is plotted every electrical angle of 30°. $I_{pk}$ represents a maximum current value (peak current value) of each phase. For example, the motor control unit 900 can generate a PWM signal to obtain the current waveform illustrated in FIG. 5.

The motor control unit 900 may perform the three-phase energization control using a neutral point when selecting the first control mode. The motor control unit 900 can turn off the fuses ISW_11 and ISW_12 and turn on the ISW_21 and ISW_22. In such a state, the motor control unit 900 may turn on, for example, all the switching elements SW_A1H, SW_B1H, SW_C1H, SW_A1L, SW_B1L, and SW_C1L of the first inverter 120. As a result, all nodes in the first inverter 120 are equipotential, and the equipotential nodes can be controlled to function as the neutral points. In such a state, the motor control unit 900 generates a PWM signal to control the switching operation of the switching elements of the second inverter 130 and outputs the PWM signal to the drive circuit 350. In this manner, the motor control unit 900 can drive the motor 200 by the three-phase energization control using the neutral point similarly to the case of Y-connection in the motor.

The motor control unit 900 can turn on the fuses ISW_11 and ISW_12 and turn off the ISW_21 and ISW_22. The motor control unit 900 may turn on all the switching elements SW_A2H, SW_B2H, SW_C2H, SW_A2L, SW_B2L, and SW_C2L of the second inverter 130. The motor control unit 900 can generate a PWM signal to control the switching operation of the switching elements of the first inverter 120 and output the PWM signal to the drive circuit 350 in a state where nodes of the second inverter 130 are controlled to function as the neutral points.

When the motor control unit 900 receives the mode signal mode indicating "10", the motor control unit 900 refers to the look-up table and selects the second control mode. The motor control unit 900 turns off the fuses ISW_11 and ISW_12 and turns on the ISW_21 and ISW_22. As a result, the motor 200 is electrically isolated from the first inverter 120 including the faulty shunt resistor, and is connected to the power supply 101 via the second inverter 130.

If the shunt resistor of the first inverter 120 is faulty, it is difficult to measure the phase current of the first inverter 120 so that it is difficult to perform PWM control of the switching elements of the first inverter 120. Therefore, the motor control unit 900 turns on all the switching elements SW_A1H, SW_B1H, SW_C1H, SW_A1L, SW_B1L, and SW_C1L of the first inverter 120. The motor control unit 900 generates a PWM signal to control the switching operation of the switching elements of the second inverter 130 and outputs the PWM signal to the drive circuit 350 in a state where nodes of the first inverter 120 are controlled to function as the neutral points.

When the motor control unit 900 receives the mode signal mode indicating "01", the motor control unit 900 refers to the look-up table and selects the second control mode. The motor control unit 900 turns on the fuses ISW_11 and ISW_12 and turns off the ISW_21 and ISW_22. As a result, the motor 200 is connected to the power supply 101 via the first inverter 120 and is electrically isolated from the second inverter 130 including the faulty shunt resistor.

If the shunt resistor of the second inverter 130 is faulty, it is difficult to measure the phase current of the second inverter 130 so that it is difficult to perform PWM control of the switching elements of the second inverter 130. Therefore, the motor control unit 900 turns on all the switching elements SW_A2H, SW_B2H, SW_C2H, SW_A2L, SW_B2L, and SW_C2L of the second inverter 130. The motor control unit 900 generates a PWM signal to control the switching operation of the switching elements of the first inverter 120 and outputs the PWM signal to the drive circuit 350 in a state where nodes of the second inverter 130 are controlled to function as the neutral points.

When the motor control unit 900 receives the mode signal mode indicating "11", the motor control unit 900 refers to the look-up table and selects the third control mode. The motor control unit 900 turns off all the fuses ISW_11, ISW_12, ISW_21, and ISW_22. As a result, the motor 200 is electrically isolated from the power supply 101.

If the shunt resistors of both the first and second inverters 120 and 130 are faulty, the three-phase energization control is not possible. Therefore, the motor control unit 900 shuts down the three-phase energization control. For example, the motor control unit 900 may output a shutdown notification signal to a shutdown circuit (see FIG. 6) that shuts down the three-phase energization control. When the motor control mode is switched to the third control mode, for example, a control mode of an electric power steering (EPS) device is switched from a torque assist mode to a manual steering mode.

According to the present example embodiment, when a certain shunt resistor is faulty, it is possible to identify any inverter between the first and second inverters 120 and 130 where the fault has occurred. Since an appropriate control mode is selected according to the output of the fault detection unit 800, the motor driving can be continued.

The motor control method according to the present disclosure is not limited to the power conversion device 1000 including the inverter unit 100 having three H bridges as illustrated in FIG. 2, and can also be suitably used for a power conversion device that drives a motor in which one ends of windings are Y-connected.

Figure 6:
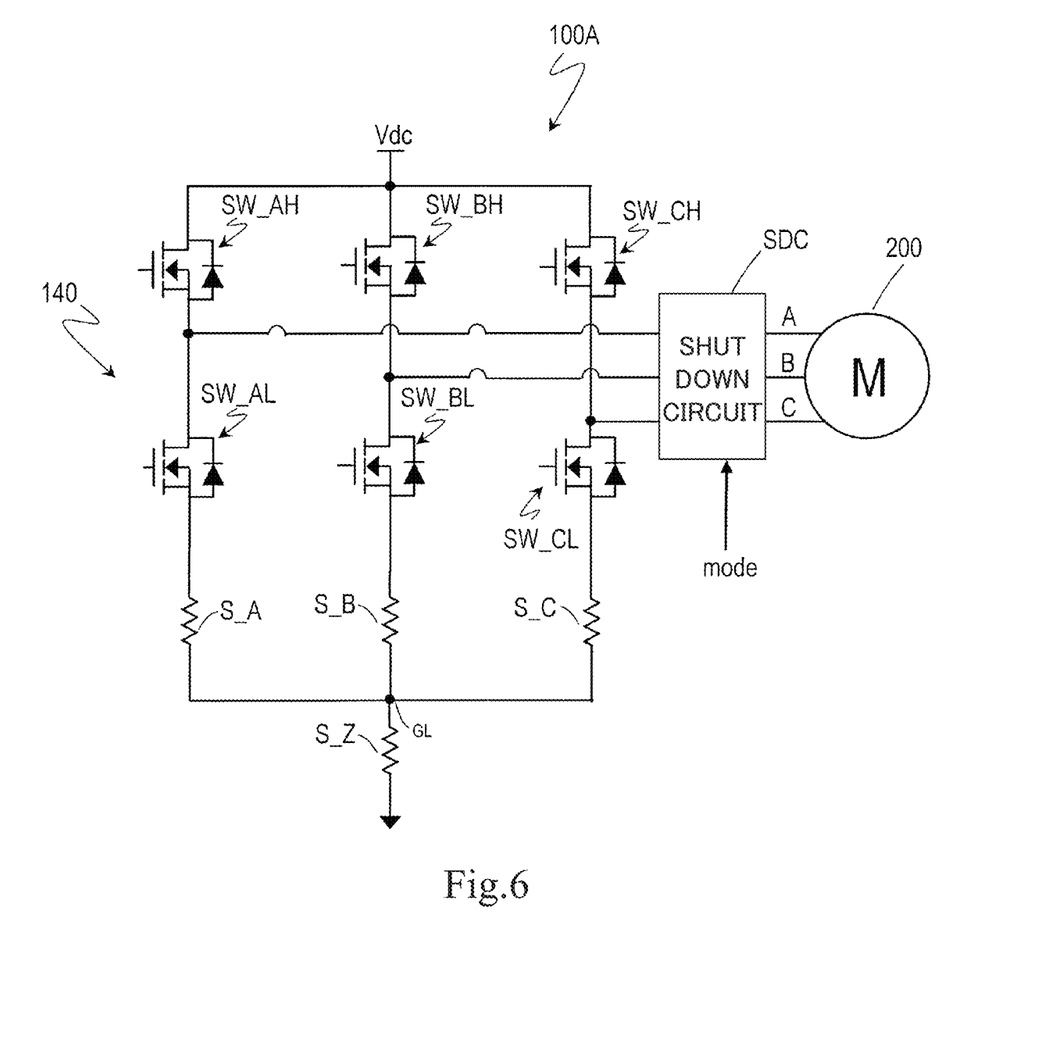
FIG. 6 is a circuit diagram schematically illustrating a circuit configuration of an inverter unit 100A having a single inverter 140 according to a modification of the first example embodiment of the present disclosure.

FIG. 6 schematically illustrates a circuit configuration of an inverter unit 100A having a single inverter 140 according to a modification of the present example embodiment.

The inverter unit 100A is connected to a motor having three-phase windings in which one ends are Y-connected. Incidentally, the present disclosure can be used for a motor capable of detecting three-phase currents, and can also be used for a motor having windings in which one ends are delta-connected. An A-phase leg of the inverter 140 includes a low-side switching element SW_AL, a high-side switching element SW_AH, and a first shunt resistor S_A. A B-phase leg includes a low-side switching element SW_BL, a high-side switching element SW_BH, and a first shunt resistor S_B. A C-phase leg has a low-side switching element SW_CL, a high-side switching element SW_CH, and a first shunt resistor S_C. A second shunt resistor S_Z configured to detect a GND current is provided on a GND line GL of the inverter 140.

The controller 340 according to the present example embodiment can execute the following processing by the same method as the fault detection method described above.

The controller 340 acquires three-phase current IA, IB, and IC flowing through the three first shunt resistors S_A, S_B, and S_C and a GND current Iz flowing through the second shunt resistor S_Z.

The controller 340 generates a fault signal indicating presence or absence of a shunt resistor fault in the inverter 140 based on the three-phase phase currents IA, IB, and IC and the GND current Iz. For example, the controller 340 can generate the fault signal using the upper blocks of the functional blocks illustrated in FIG. 4.

The controller 340 refers to a table representing a relationship between a level of the fault signal and a plurality of control modes, and selects one control mode from among the plurality of control modes. Examples of the plurality of control modes can include a control mode in which three-phase energization control is performed during a normal state (corresponding to the first control mode) and a control mode in which the three-phase energization control is shut down during an abnormal state (corresponding to the third control mode).

The controller 340 controls a switching operation of switching elements of the inverter 140 in accordance with the selected control mode.

In the configuration of the inverter unit 100A illustrated in FIG. 6, it is possible to determine that the shunt resistor is not faulty if a difference, obtained by comparing a sum of the three-phase currents IA, IB, and IC with the GND current Iz, is within an allowable range. If the difference exceeds the allowable range, it is possible to determine that at least one of the three shunt resistors S_A, S_B, and S_C is faulty. The control mode can be switched based on the determination result. It is preferable to perform switching to the control mode of shutting down the three-phase energization control when the shunt resistor fault is detected. As illustrated in FIG. 6, the mode signal mode from the fault detection unit 800 can be output to a shutdown circuit SDC that cuts off the connection between the motor 200 and the inverter 140.

Figure 7:
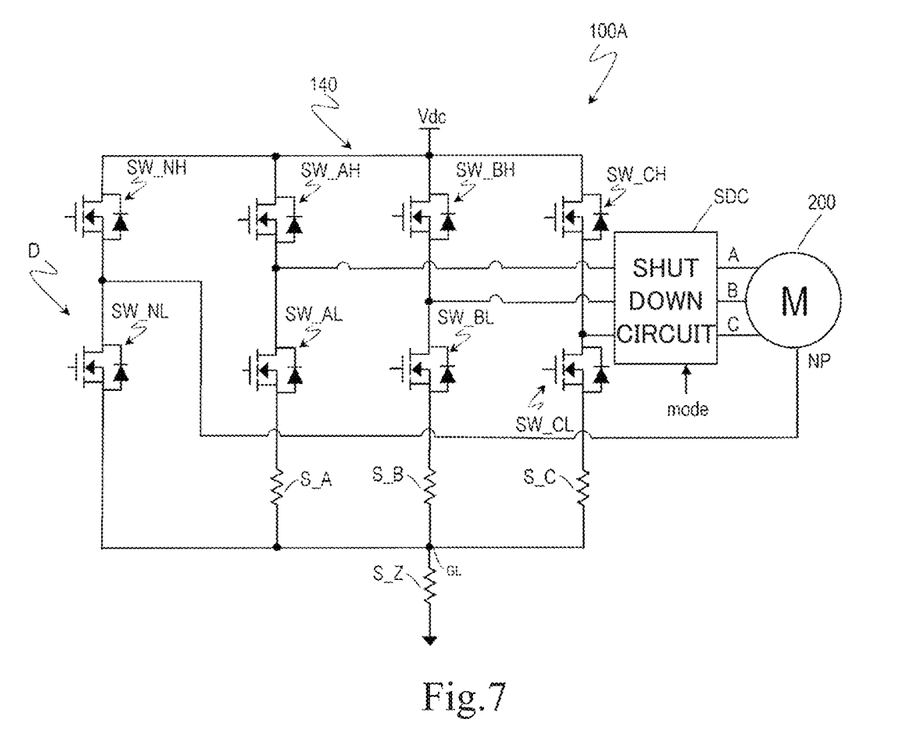
FIG. 7 is a circuit diagram schematically illustrating a circuit configuration of the inverter unit 100A having the single inverter 140 according to another modification of the first example embodiment of the present disclosure.

FIG. 7 schematically illustrates a circuit configuration of the inverter unit 100A having the single inverter 140 according to another modification of the present example embodiment.

As illustrated in FIG. 7, the inverter unit 100A may further include a neutral leg D. The neutral leg D includes a high-side switching element SW_NH and a low-side switching element SW_NL. When a connection scheme in the motor 200 is Y-connection, the neutral leg D, specifically, a node between the high-side switching element SW_NH and the low-side switching element SW_NL is connected to a neutral node NP of the motor in which one ends of the windings M1, M2 and M3 are Y-connected. The neutral leg D is connected between low-side and high-side nodes connecting the three legs of the inverter 130.

In the configuration according to this modification, the fault detection unit 800 can detect a shunt resistor fault in the same manner as in the above-described case. FIG. 7 illustrates the neutral leg D having no shunt resistor. However, the neutral leg D can also have a shunt resistor (not illustrated) similarly to the leg of the inverter 140. In such a case, the fault detection unit 800 can determine the presence or absence of a fault of each shunt resistor by comparing a current detected by the shunt resistor of the neutral leg D with each current detected by the shunt resistors S_A, S_B, and S_C.

The fault detection unit 800 can detect a fault of the shunt resistor S_Z by comparing a current value detected by the shunt resistor of the neutral leg D with the current detected by the shunt resistor S_Z. Further, the fault detection unit 800 can detect the fault of each shunt resistor by comparing the current values detected by the shunt resistor of the neutral leg D and the shunt resistors S_A, S_B, S_C and S_Z with each other.

Figure 8:
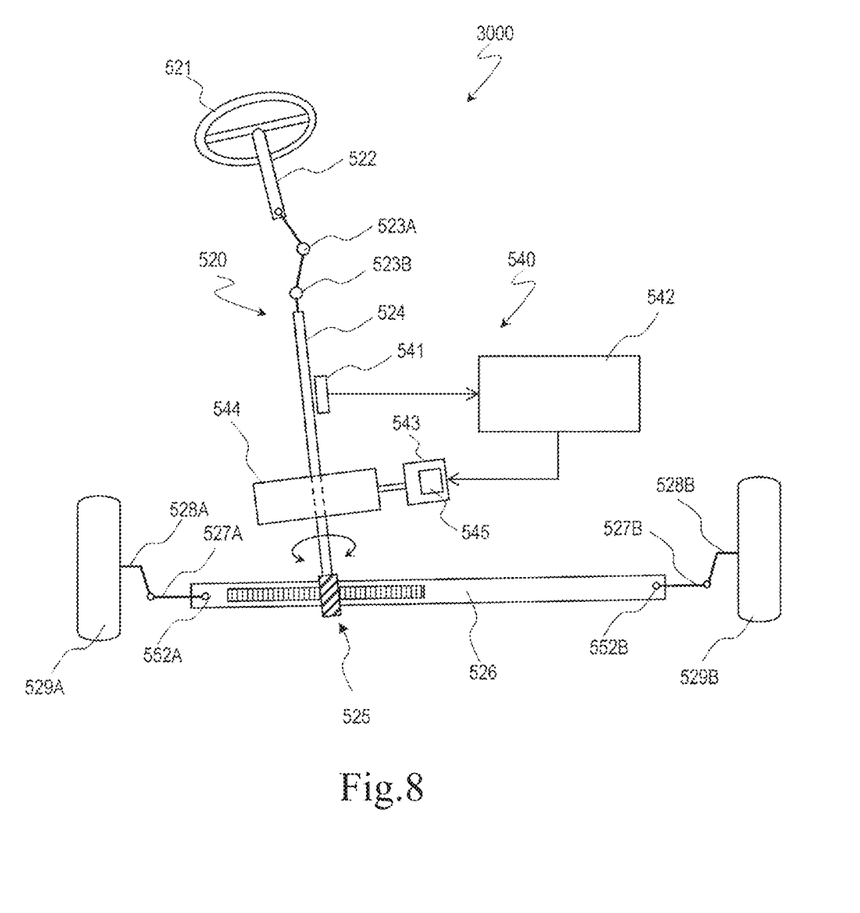
FIG. 8 is a schematic view illustrating a typical configuration of an electric power steering device 3000 according to the first example embodiment of the present disclosure.

FIG. 8 schematically illustrates a typical configuration of an electric power steering device 3000 according to the present example embodiment.

A vehicle such as an automobile generally has an electric power steering device. The electric power steering device 3000 according to the present example embodiment includes a steering system 520 and an auxiliary torque mechanism 540 that generates an auxiliary torque. The electric power steering device 3000 generates the auxiliary torque that assists a steering torque of the steering system generated when a driver operates a steering wheel. A burden on the operation of the driver is reduced by the auxiliary torque.

The steering system 520 can be constituted by, for example, a steering handle 521, a steering shaft 522, universal shaft joints 523A and 523B, a rotating shaft 524, a rack and pinion mechanism 525, a rack shaft 526, left and right ball joints 552A and 552B, tie rods 527A and 527B, knuckles 528A and 528B, and left and right steering wheels 529A and 529B.

The auxiliary torque mechanism 540 can be constituted by, for example, a steering torque sensor 541, an automotive electronic control unit (ECU) 542, a motor 543, a speed reduction mechanism 544, and the like. The steering torque sensor 541 detects a steering torque in the steering system 520. The ECU 542 generates a drive signal based on a detection signal of the steering torque sensor 541. The motor 543 generates an auxiliary torque corresponding to the steering torque based on the drive signal. The motor 543 transmits the generated auxiliary torque to the steering system 520 via the speed reduction mechanism 544.

The ECU 542 includes, for example, the controller 340 and the drive circuit 350 according to the first example embodiment. In automobiles, an electronic control system using the ECU as the core is constructed. In the electric power steering device 3000, for example, a motor drive unit is constructed by the ECU 542, the motor 543, and an inverter 545. The motor module 2000 according to the first example embodiment can be suitably used for such a system.

The example embodiments of the present disclosure are also suitably used for motor control systems such as X-by-wire, such as shift-by-wire, steering-by-wire, and brake-by-wire, and a traction motor. For example, an EPS that implements the motor control method according to the example embodiment of the present disclosure can be installed in autonomous vehicles that comply with levels 0 to 4 (standards for automation) defined by the Japanese government and the US National Highway Traffic Safety Administration (NHTSA).

Example embodiments of the present disclosure can be widely used in various devices including various motors such as a vacuum cleaner, a dryer, a ceiling fan, a washing machine, a refrigerator, and an electric power steering device.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor control method used in a power conversion device that converts power from a power supply into power to be supplied to a motor having n-phase windings, where n is an integer of three or more, and includes a first inverter connected to first ends of the n-phase windings and a second inverter connected to second ends of the n-phase windings, the motor control method comprising:
    a current acquisition step of acquiring n-phase currents flowing through n first shunt resistors included in n legs of the first inverter, a GND current flowing through a second shunt resistor provided on a GND line of the first inverter, n-phase currents flowing through n third shunt resistors included in n legs of the second inverter, and a GND current flowing through a fourth shunt resistor provided on a GND line of the second inverter;
    a fault signal generation step of generating a first fault signal indicating presence or absence of a shunt resistor fault in the first inverter based on the n-phase currents flowing through the n first shunt resistors and the GND current flowing through the second shunt resistor and generating a second fault signal indicating presence or absence of a shunt resistor fault in the second inverter based on the n-phase currents flowing through the n third shunt resistors and the GND current flowing through the fourth shunt resistor;
    a control mode selection step of referring to a table representing a relationship between a set of levels of the first fault signal and the second fault signal and a plurality of control modes and selecting one control mode from among the plurality of control modes; and
    a motor control step of controlling the motor in accordance with the selected control mode.

2. The motor control method according to claim 1, wherein the fault signal generation step includes:
    calculating a first absolute value of a difference between a sum of the n-phase currents flowing through the n first shunt resistors and the GND current flowing through the second shunt resistors; and
    calculating a second absolute value of a difference between a sum of the n-phase currents flowing through the n third shunt resistors and the GND current flowing through the fourth shunt resistor.

3. The motor control method according to claim 2, wherein the fault signal generation step includes:
    generating the first fault signal based on a comparison result between the first absolute value and a first allowable limit value; and
    generating the second fault signal based on a comparison result between the second absolute value and a second allowable limit value.

4. The motor control method according to claim 2, wherein, in the fault signal generation step:
    the first fault signal indicating a shunt resistor fault in the first inverter is generated when the first absolute value exceeds the first allowable limit value, and the first fault signal indicating no shunt resistor fault in the first inverter is generated when the first absolute value is less than the first allowable limit value; and
    the second fault signal indicating a shunt resistor fault in the second inverter is generated when the second absolute value exceeds the second allowable limit value, and the second fault signal indicating no shunt resistor fault in the second inverter is generated when the second absolute value is less than the second allowable limit value.

5. The motor control method according to claim 1, wherein the plurality of control modes include:
    a first control mode in which the n-phase winding is energized using the first and second inverters or using a neutral point of one of the first and second inverters and the other inverter;
    a second control mode in which the n-phase winding is energized using the neutral point of one of the first and second inverters including a faulty shunt resistor and the other inverter; and
    a third control mode in which energization of the n-phase winding is shut down.

6. The motor control method according to claim 5, wherein, in the control mode selection step:
    the first control mode is selected as the control mode when the first fault signal indicates no shunt resistor fault in the first inverter and the second fault signal indicates no shunt resistor fault in the second inverter;
    the second control mode is selected as the control mode when the first fault signal indicates no shunt resistor fault in the first inverter and the second fault signal indicates a shunt resistor fault in the second inverter or when the first fault signal indicates a shunt resistor fault in the first inverter and the second fault signal indicates no shunt resistor fault in the second inverter; and
    the third control mode is selected as the control mode when the first fault signal indicates a shunt resistor fault in the first inverter and the second fault signal indicates a shunt resistor fault in the second inverter.

7. A motor control method used in a power conversion device that converts power from a power supply into power to be supplied to a motor having n-phase windings where n is an integer of three or more, and includes an inverter connected to the n-phase windings, the motor control method comprising:

a current acquisition step of acquiring n-phase currents flowing through n first shunt resistors included in n legs of the inverter and a GND current flowing through a second shunt resistor provided on a GND line of the inverter;

a fault signal generation step of generating a fault signal indicating presence or absence of a shunt resistor fault in the inverter based on the n-phase currents and the GND current;

a control mode selection step of referring to a table representing a relationship between a level of the fault signal and a plurality of control modes and selecting one control mode from among the plurality of control modes; and a motor control step of controlling the motor in accordance with the selected control mode.

8. The motor control method according to claim 7, wherein the power conversion device further includes a neutral leg including a low-side switch, a high-side switch, and a third shunt resistor, the neutral leg connected to a neutral node of the motor in which first ends of the n-phase windings are Y-connected;

a current flowing through the third shunt resistor is further acquired in the current acquisition step; and a fault signal indicating presence or absence of a shunt resistor fault in the inverter is generated based on the current flowing through the third shunt resistor, the n-phase currents, and the GND current in the fault signal generation step.

9. A power conversion device that converts power from a power supply into power to be supplied to a motor including n-phase windings, where n is an integer of three or more, the power conversion device comprising:

a first inverter including n legs each including a low-side switch, a high-side switch, and a first shunt resistor and is connected to first ends of the n-phase windings, the first inverter including a second shunt resistor to detect a GND current provided on a GND line;

a second inverter including n legs each including a low-side switch, a high-side switch, and a third shunt resistor and is connected to second ends of the n-phase windings, the second inverter including a fourth shunt resistor to detect a GND current provided on a GND line; and a control circuit that controls a switching operation of switches of the first and second inverters;

the control circuit acquiring n-phase currents flowing through n first shunt resistors included in the n legs of the first inverter, the GND current flowing through the second shunt resistor of the first inverter, n-phase currents flowing through n third shunt resistors included in the n legs of the second inverter, and the GND current flowing through the fourth shunt resistor of the second inverter;

the control circuit generating a first fault signal indicating presence or absence of a shunt resistor fault in the first inverter based on the n-phase currents flowing through the n first shunt resistors and the GND current flowing through the second shunt resistor and generating a second fault signal indicating presence or absence of a shunt resistor fault in the second inverter based on the n-phase currents flowing through the n third shunt resistors and the GND current flowing through the fourth shunt resistor;

the control circuit referring to a table representing a relationship between a set of levels of the first fault signal and the second fault signal and a plurality of control modes and selecting one control mode from among the plurality of control modes;

the control circuit controlling the switching operation of the switches of the first and second inverters in accordance with the selected control mode.

10. A power conversion device that converts power from a power supply into power to be supplied to a motor including n-phase windings, where n is an integer of three or more, the power conversion device comprising:

an inverter including n legs each including a low-side switch, a high-side switch, and a first shunt resistor and is connected to the n-phase windings, the inverter including a second shunt resistor to detect a GND current provided on a GND line; and a control circuit that controls a switching operation of a switch of the inverter;

the control circuit acquiring n-phase currents flowing through the n first shunt resistors and the GND current flowing through the second shunt resistor;

the control circuit generating a fault signal indicating presence or absence of a shunt resistor fault in the inverter based on the n-phase currents and the GND current;

the control circuit referring to a table representing a relationship between a level of the fault signal and a plurality of control modes and selecting one control mode from among the plurality of control modes;

the control circuit controlling the switching operation of the switch of the inverter in accordance with the selected control mode.

11. The power conversion device according to claim 10, further comprising a neutral leg including a low-side switch and a high-side switch, the neutral leg connected to a neutral node of the motor in which first ends of the n-phase windings are Y-connected.

12. The power conversion device according to claim 11, wherein the neutral leg is connected between a low-side node and a high-side node connecting the n legs of the inverter.

13. The power conversion device according to claim 12, wherein the neutral leg includes a third shunt resistor.

14. A motor module comprising:
a motor; and
the power conversion device according to claim 9.

15. An electric power steering device comprising the motor module according to claim 14.

* * * * *